US012738857B2

(12) United States Patent
Fujiwara

(10) Patent No.: US 12,738,857 B2
(45) Date of Patent: Sep. 15, 2026

(54) POWER CONVERTER

(71) Applicant: Mitsubishi Electric Corporation, Tokyo (JP)

(72) Inventor: Tetsuro Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 453 days.

(21) Appl. No.: 18/154,411

(22) Filed: Jan. 13, 2023

(65) Prior Publication Data

US 2024/0120833 A1 Apr. 11, 2024

(30) Foreign Application Priority Data

Oct. 3, 2022 (JP) ................................. 2022-159217

(51) Int. Cl.
*H02M 7/5387* (2007.01)
*H02M 7/00* (2006.01)
*H02M 1/44* (2007.01)

(52) U.S. Cl.
CPC ......... *H02M 7/003* (2013.01); *H02M 7/5387* (2013.01); *H02M 1/44* (2013.01)

(58) Field of Classification Search
CPC ........ H02M 1/44; H02M 7/003; H02M 7/538; H02M 7/5387
See application file for complete search history.

(56) References Cited

U.S. PATENT DOCUMENTS

2014/0118909 A1* 5/2014 Matsuno ............... H02M 7/003 361/679.01
2019/0189994 A1* 6/2019 Narayanan .......... H01M 50/503

FOREIGN PATENT DOCUMENTS

JP 3583034 B2 10/2004
JP 2005-33934 A 2/2005
JP 2021-5983 A 1/2021

OTHER PUBLICATIONS

Japanese Office Action dated Aug. 19, 2025, issued in Japanese application No. 2022-159217.

* cited by examiner

*Primary Examiner* — Gary L Laxton
(74) *Attorney, Agent, or Firm* — Sughrue Mion, PLLC

(57) ABSTRACT

Provided is a power converter in which increase in the wiring inductance of a busbar connected to a capacitor is effectively suppressed. The power converter includes: a capacitor having a first electrode and a second electrode; and a specific busbar connected to a specific electrode which is one or each of both of the first electrode and the second electrode. The specific busbar has a folded wiring portion having parts opposing each other by being folded, at the specific electrode, and an end of the folded wiring portion is connected to the specific electrode.

11 Claims, 11 Drawing Sheets

POWER CONVERTER

BACKGROUND

The present disclosure relates to a power converter.

A power converter is a device for converting input current from DC to AC or from AC to DC, or converting input voltage to different voltage. In recent years, a power converter having a high power density with reduced power loss has been required. Therefore, switching elements such as an insulated gate bipolar transistor (IGBT) and a metal oxide semiconductor field effect transistor (MOSFET) for supplying power are being developed to achieve large current, high voltage, and high-speed switching. Due to such large current, high voltage, and high-speed switching of the switching element, surge voltage occurring in switching of the switching element increases. Due to increase in surge voltage, switching loss and heat generation in the switching element increase. In order to suppress the heat generation, a high-heat-dissipation member may be provided to the power converter. However, in the case of providing the high-heat-dissipation member to the power converter, cost increase of the power converter and size increase of the power converter are inevitable.

The magnitude of surge voltage due to switching of the switching element depends on the magnitude of the wiring inductance of a part such as a busbar of a capacitor electrically connected to the switching element. If the wiring inductance is great, the surge voltage becomes great. As effective means for reducing the wiring inductance, a busbar may be shortened, or designing may be made such that currents flow in opposite directions respectively through busbars arranged as a pair, so as to cancel magnetic fluxes generated at the pair of busbars, for example.

A structure in which currents flow in opposite directions respectively through a pair of busbars is disclosed (see, for example, Patent Document 1). In Patent Document 1, the pair of opposing busbars overlap each other, and the respective opposing busbars are electrically connected to both electrodes of each capacitor. With this structure, currents flow in opposite directions respectively through the pair of opposing busbars, so that magnetic fluxes generated around the busbars are canceled, whereby increase in the wiring inductances of the busbars can be suppressed.

Patent Document 1: Japanese Patent No. 3583034

In Patent Document 1, since currents flow in opposite directions respectively through a positive busbar and a negative busbar opposing each other, increase in the wiring inductances of the busbars can be suppressed. However, as in Patent Document 1, in a case where the electrodes of the capacitor are provided away from each other at a body part of the capacitor (in Patent Document 1, on both sides of the body part of the capacitor), in connection between the electrodes of the capacitor and the busbars, the position of a connection wire on the positive side and the position of a connection wire on the negative side are far from each other, and therefore magnetic fluxes generated around the respective connection wires are not canceled in this arrangement. Thus, since the wiring inductances of the connection wires connecting the electrodes of the capacitor and the busbars are not reduced, there is a problem that increase in the wiring inductances of the busbars connected to the capacitor cannot be sufficiently suppressed.

SUMMARY

Accordingly, an object of the present disclosure is to provide a power converter in which increase in the wiring inductance of a busbar connected to a capacitor is effectively suppressed.

A power converter according to the present disclosure includes: a capacitor having a first electrode and a second electrode; and a specific busbar connected to a specific electrode which is one or each of both of the first electrode and the second electrode. The specific busbar has a folded wiring portion having parts opposing each other by being folded, at the specific electrode, and an end of the folded wiring portion is connected to the specific electrode.

The power converter according to the present disclosure includes: the capacitor having the first electrode and the second electrode; and the specific busbar connected to the specific electrode which is one or each of both of the first electrode and the second electrode. The specific busbar has the folded wiring portion having parts opposing each other by being folded, at the specific electrode, and an end of the folded wiring portion is connected to the specific electrode. Thus, the wiring part before folding and the wiring part after folding in the folded wiring portion are located so as to oppose each other, and currents flow in opposite directions respectively through the opposing wiring parts, so that magnetic fluxes generated due to current flowing through the folded wiring portion are canceled, whereby increase in the wiring inductance of the specific busbar connected to the capacitor can be effectively suppressed.

DETAILED DESCRIPTION OF THE EMBODIMENTS

Figure 1:
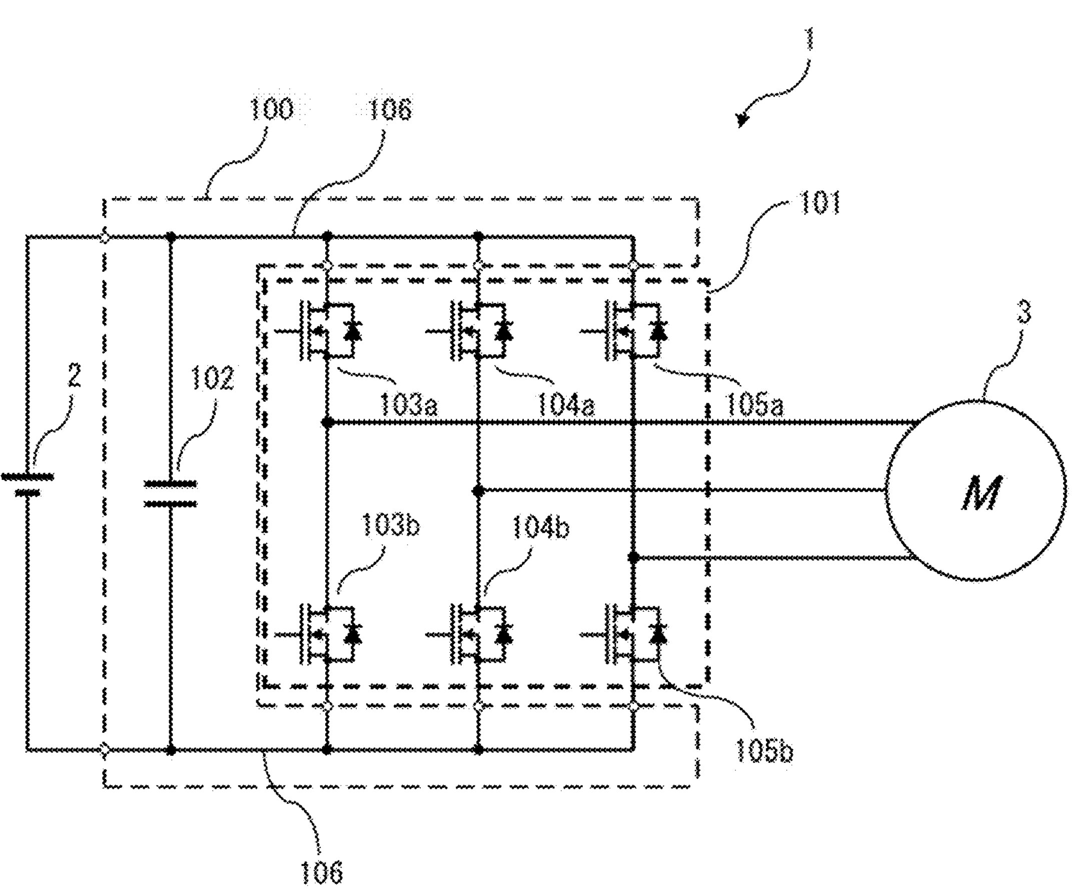
FIG. 1 shows the circuit configuration of a power converter according to the first embodiment of the present disclosure.

Hereinafter, a power converter according to embodiments of the present disclosure will be described with reference to the drawings. In the drawings, the same or corresponding members and parts are denoted by the same reference characters, to give description.

First Embodiment

Figure 2:
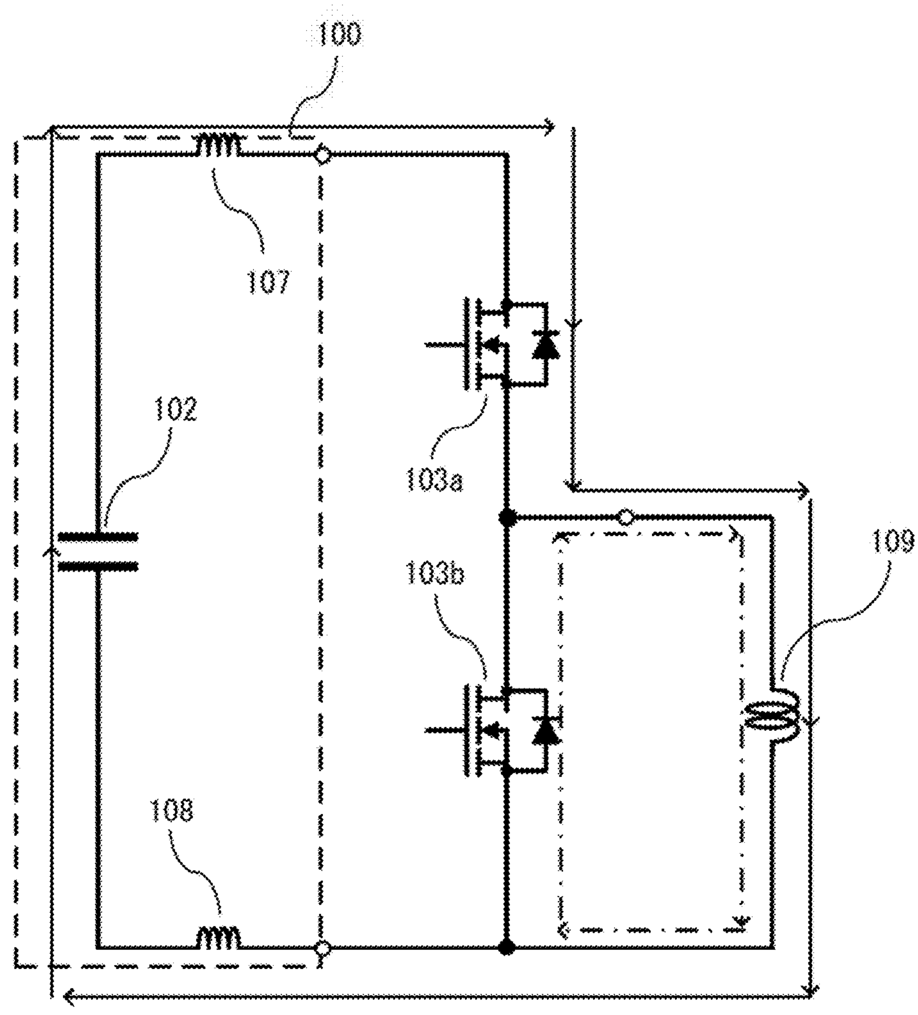
FIG. 2 is a circuit diagram illustrating switching operation in a U-phase arm of the power converter according to the first embodiment.
Figure 3:
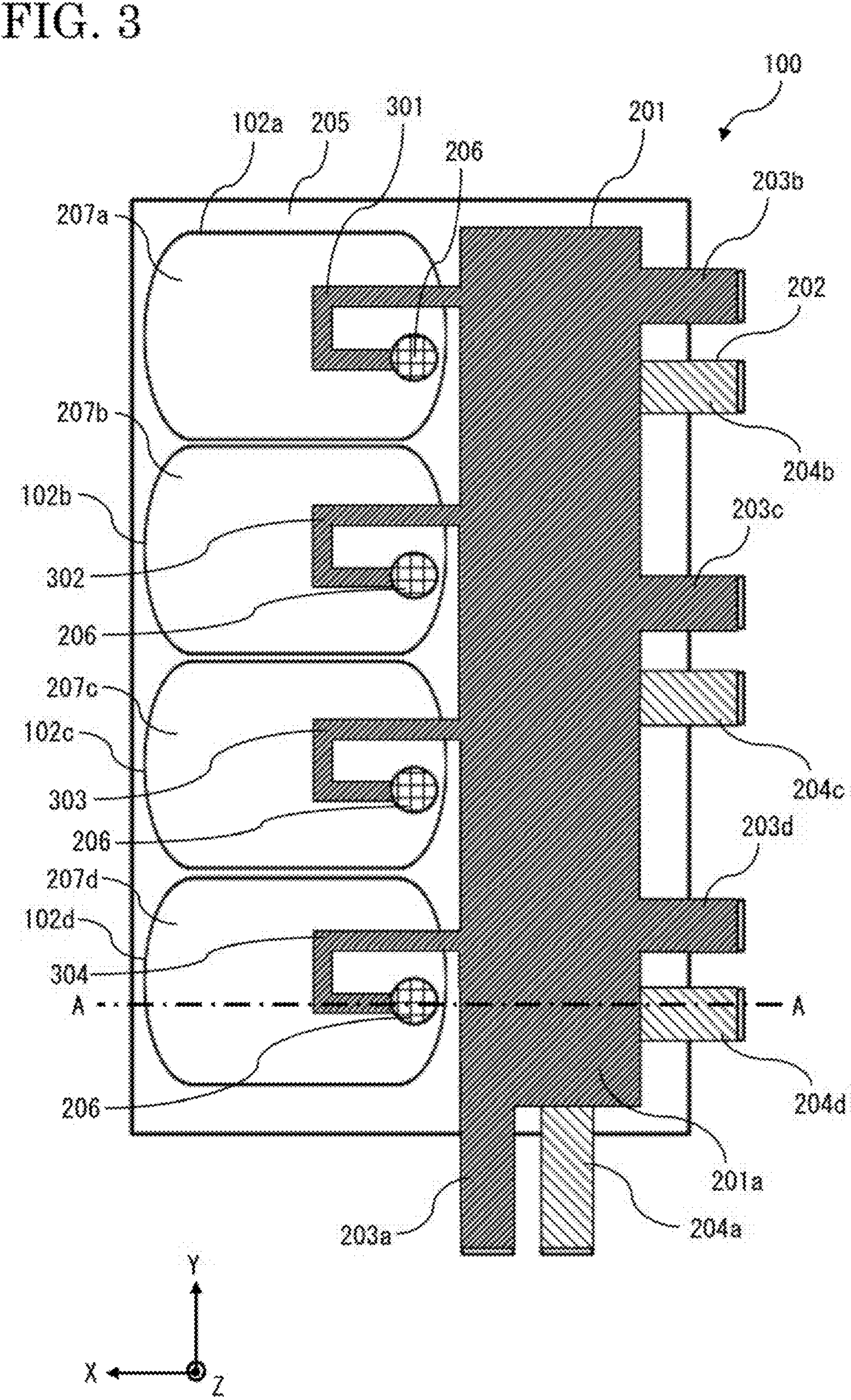
FIG. 3 is a plan view of a capacitor module of the power converter according to the first embodiment.
Figure 4:
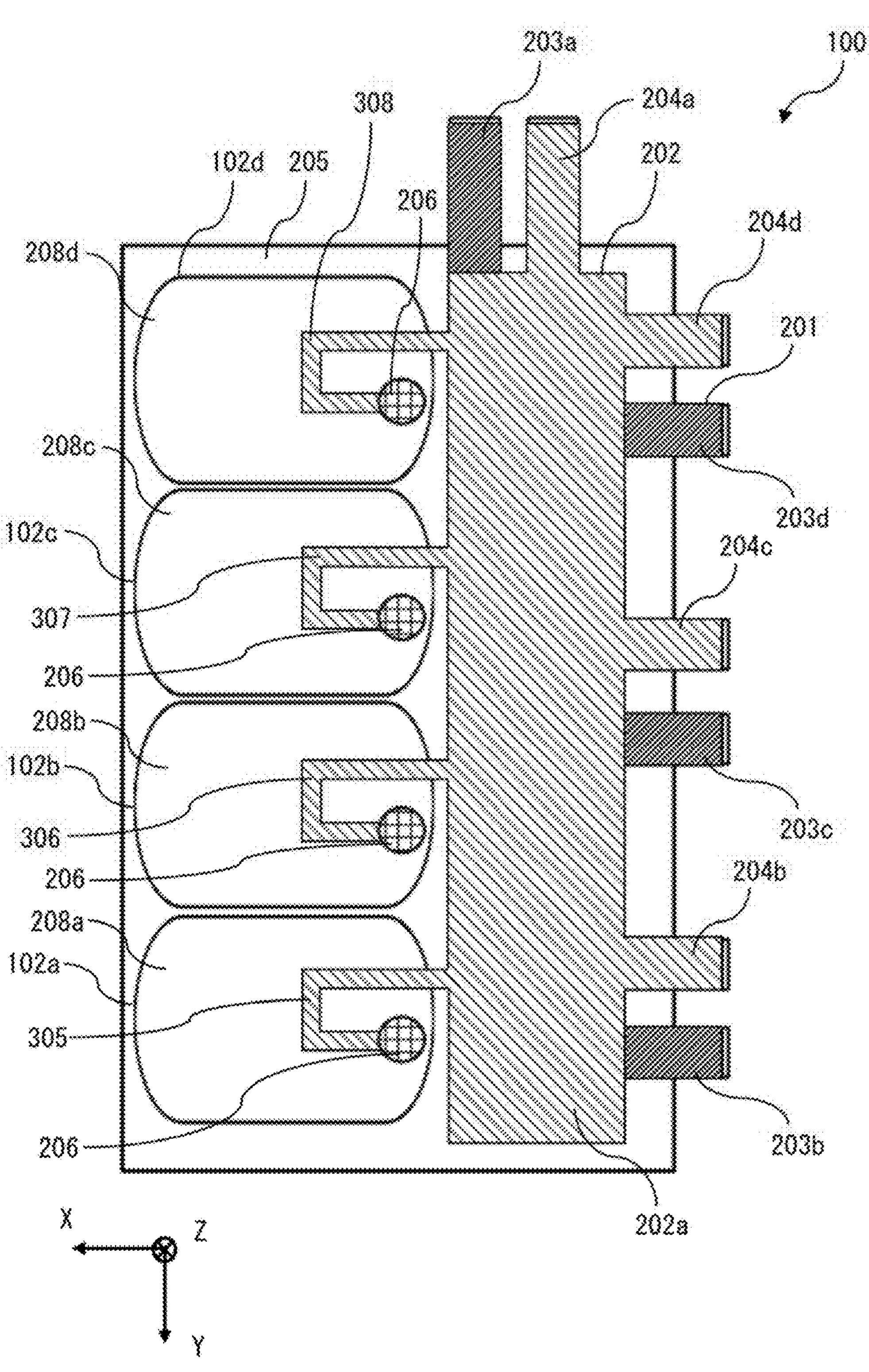
FIG. 4 is a plan view of the capacitor module of the power converter according to the first embodiment.
Figure 5:
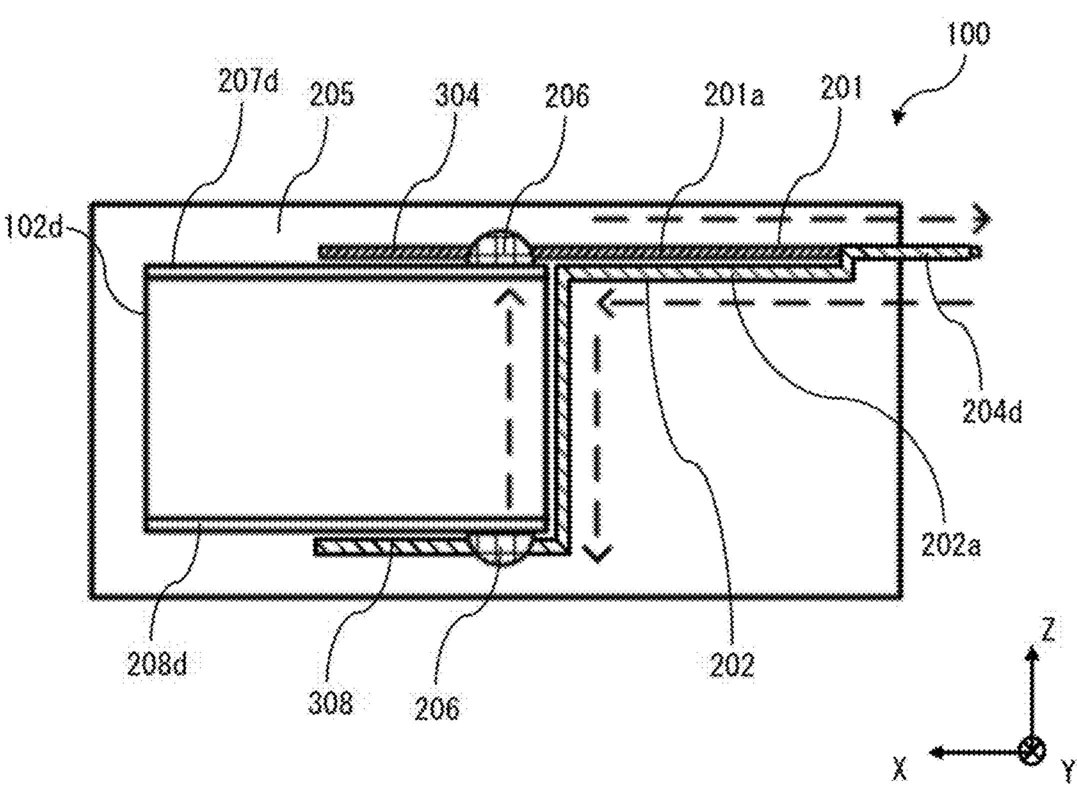
FIG. 5 is a sectional view of the capacitor module of the power converter taken at an A-A cross-section position in FIG. 3.
Figure 6:
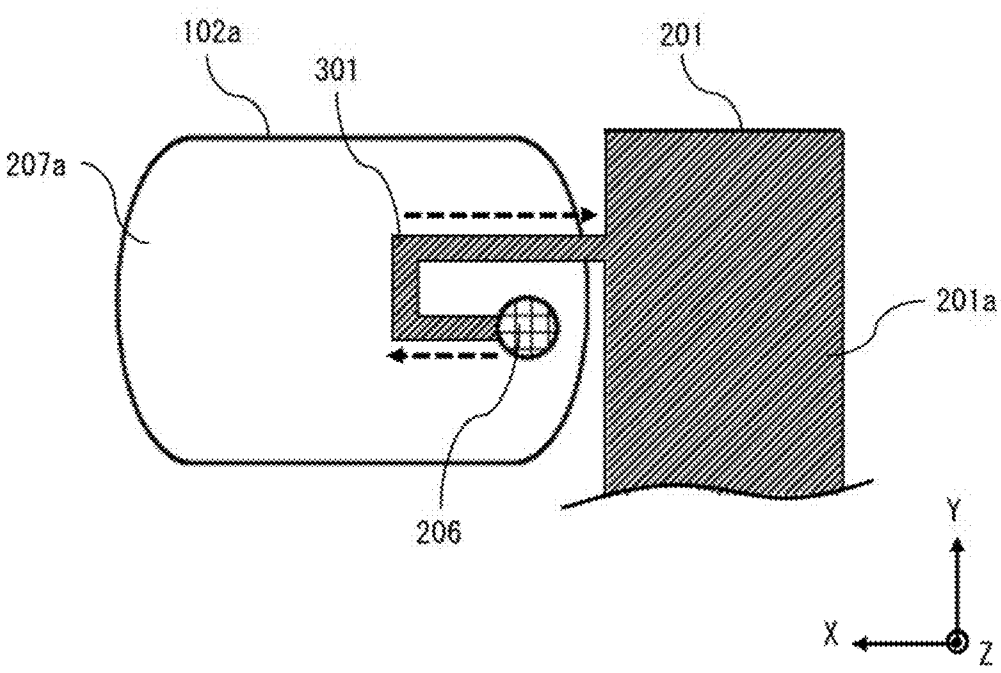
FIG. 6 is a plan view of a major part of the capacitor module of the power converter according to the first embodiment.
Figure 7A:
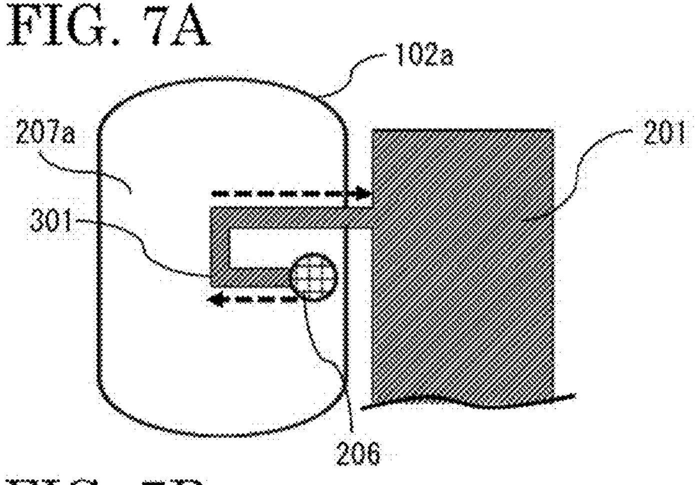
FIGS. 7A to 7D are plan views of major parts of other capacitor modules of the power converter according to the first embodiment.
Figure 7B:
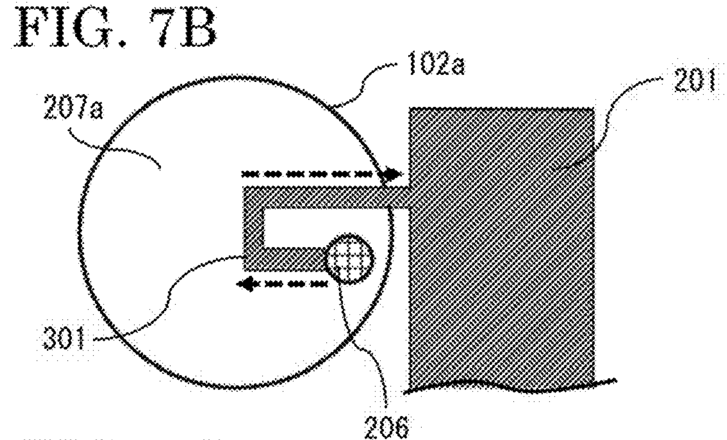
Figure 7C:
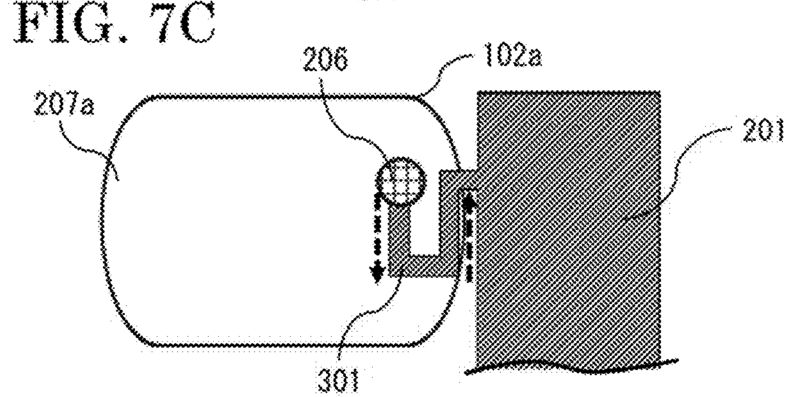
Figure 7D:
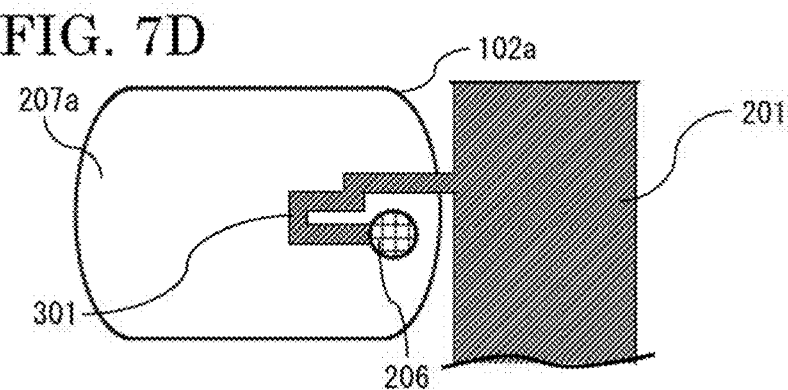
Figure 8A:
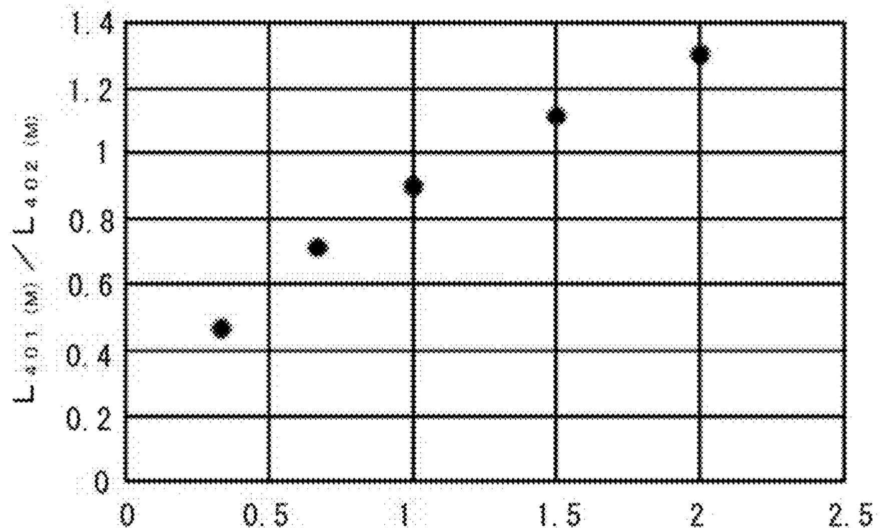
FIGS. 8A to 8C illustrate a reduction rate of a wiring inductance in the power converter according to the first embodiment.
Figure 8B:
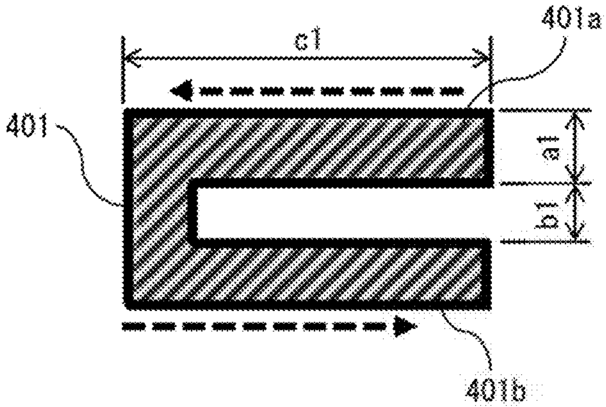
Figure 8C:
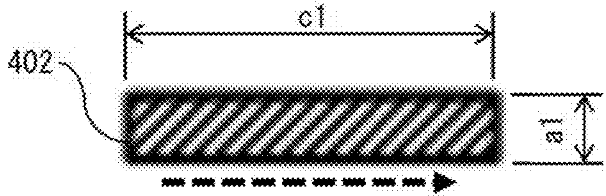

FIG. 1 shows the circuit configuration of a power converter 1 according to the first embodiment. FIG. 2 is a circuit diagram illustrating switching operation in a U-phase arm of the power converter 1. FIG. 3 is a plan view of a capacitor module 100 of the power converter 1 and shows one side in a Z direction with mold resin 205 partially removed. FIG. 4 is a plan view of the capacitor module 100 of the power converter 1 and shows another side in the Z direction with the mold resin 205 partially removed. FIG. 5 is a sectional view of the capacitor module 100 of the power converter 1 taken at an A-A cross-section position in FIG. 3. FIG. 6 is a plan view of a major part of the capacitor module 100 of the power converter 1. FIGS. 7A to 7D are plan views of major parts of other capacitor modules 100 of the power converter 1. FIGS. 8A to 8C illustrate a reduction rate of a wiring inductance in the power converter 1. The power converter 1 is a device for converting input current from DC to AC or from AC to DC, or converting input voltage to different voltage. In the present disclosure, the power converter 1 is described as a three-phase inverter for converting DC power to AC power, to drive a three-phase AC motor. However, the power converter according to the present disclosure is not limited to the three-phase inverter.

<Power Converter 1>

The circuit configuration of the power converter 1 will be described with reference to FIG. 1. FIG. 1 shows a three-phase inverter circuit for driving a three-phase AC motor 3. The power converter 1 includes the capacitor module 100 and a switching circuit 101. The capacitor module 100 is connected to a DC power supply 2 present outside the power converter 1. The switching circuit 101 connected to a smoothing capacitor 102 included in the capacitor module 100 includes semiconductor elements for performing, through switching, power conversion of DC voltage applied to the smoothing capacitor 102. The switching circuit 101 converts DC power to AC power. The AC power is outputted to the three-phase AC motor 3 present outside, to drive the three-phase AC motor 3.

The capacitor module 100 includes the smoothing capacitor 102 which is a capacitor for smoothing DC voltage, and specific busbars 106 connecting the smoothing capacitor 102 and the switching circuit 101. In the present embodiment, the capacitor included in the capacitor module 100 is described as the smoothing capacitor 102, but the capacitor is not limited to the smoothing capacitor 102. The capacitor may be a decoupling capacitor provided on a power supply line, or may be a filter capacitor for removing noise. The smoothing capacitor 102 has a first electrode and a second electrode. One of the first electrode and the second electrode is a positive electrode, and the other is a negative electrode.

The switching circuit 101 includes, as a three-phase inverter circuit, a U-phase arm in which U-phase switching elements 103_a_, 103_b_ which are semiconductor elements are connected in series, a V-phase arm in which V-phase switching elements 104_a_, 104_b_ which are semiconductor elements are connected in series, and a W-phase arm in which W-phase switching elements 105_a_, 105_b_ which are semiconductor elements are connected in series. The switching elements of the arms for the respective phases are controlled to be ON/OFF in a predetermined order, to generate three-phase AC currents. By the generated three-phase AC currents, the three-phase AC motor 3 is driven.

As the switching element of the arm for each phase, for example, a self-turn-off semiconductor switching element such as a metal oxide semiconductor field effect transistor (MOSFET) or an insulated gate bipolar transistor (IGBT) to which a diode is connected in antiparallel, is used. In the present embodiment, a MOSFET is used and a parasitic diode of the MOSFET is used as a flyback diode. However, for example, in a case of using a switching element such as an IGBT not having a parasitic diode, a flyback diode may be added in parallel. Alternatively, a reverse conducting IGBT (RC-IGBT) in which a switching element and a flyback diode are integrated may be used.

The switching element of the arm for each phase is formed at a semiconductor substrate made of a material such as silicon, silicon carbide (SiC), or gallium nitride (GaN). As the switching element, a wide bandgap semiconductor element having a wider bandgap than silicon may be used. In a case of using, for example, a MOSFET made of silicon carbide which is a wide bandgap semiconductor element, a temporal change amount di/dt of current occurring in switching can be made greater than in a case of a MOSFET made of silicon. In addition, the wide bandgap semiconductor element is small in ON resistance, small in loss, and small in heat generation amount, and therefore the chip area can be reduced. Since the chip area is reduced, the switching circuit 101 can be downsized.

<Wiring Inductance and Surge Voltage>

The relationship between a wiring inductance and surge voltage will be described with reference to FIG. 2. FIG. 2 is a circuit diagram in which, for simplification, of the switching circuit 101, only the U-phase switching elements 103_a_, 103_b_ are shown, and the three-phase AC motor 3 is replaced with an inductance load 109. In FIG. 2, a wiring inductance on the positive side of the smoothing capacitor 102 is shown as a wiring inductance 107, and a wiring inductance on the negative side is shown as a wiring inductance 108. Specifically, the wiring inductances 107, 108 are wiring inductances due to the specific busbars 106 at the capacitor module 100.

OFF surge voltage ΔVs when the U-phase switching element 103_a_ turns from ON to OFF will be described. In FIG. 2, when the U-phase switching element 103_a_ is ON, a current route shown by solid-line arrows is formed. When the U-phase switching element 103_a_ is OFF, a current route shown by dotted-dashed-line arrows is formed. As the current route switches when the U-phase switching element 103_a_ turns from ON to OFF, current flowing through the wiring changes at a slope of di/dt. Where the magnitude of the wiring inductance 107 is denoted by $L_{107}$ and the magnitude of the wiring inductance 108 is denoted by $L_{108}$, the OFF surge voltage ΔVs can be represented by Expression (1).

[Mathematical 1]

$$\Delta Vs=(L_{107}+L_{108})\times di/dt \tag{1}$$

As shown in Expression (1), the OFF surge voltage ΔVs is proportional to the sum of the wiring inductances $L_{107}$, $L_{108}$. Therefore, if components of these wiring inductances can be reduced, surge voltage can be reduced.

<Capacitor Module 100>

The capacitor module 100 will be described with reference to FIG. 3 to FIG. 5. In the drawings, the height direction of the capacitor module 100 is defined as a Z direction, directions perpendicular to the Z direction are defined as an X direction and a Y direction. That is, an X-Y direction is a plane direction of the capacitor module 100. In the present embodiment, the X direction is defined as a first direction, and the Y direction is defined as a second direction. FIG. 3 is a plan view of the capacitor module 100 along the X-Y direction. FIG. 4 is a bottom view of the capacitor module 100 along the X-Y direction. FIG. 5 is a sectional view of the capacitor module 100 along an X-Z direction. In FIG. 3 and FIG. 4, as the mold resin 205, only the outer shape thereof is shown.

The capacitor module 100 includes a plurality of smoothing capacitors 102 each having electrodes at both ends. In the present embodiment, as shown in FIG. 3, the capacitor module 100 includes four smoothing capacitors 102*a*, 102*b*, 102*c*, 102*d*. The number of the smoothing capacitors 102 is not limited to four, and may be one. In the present embodiment, as shown in FIG. 5, a positive electrode 207*d* which is the first electrode and a negative electrode 208*d* which is the second electrode are provided on both sides of the smoothing capacitor 102*d*. However, locations of the positive electrode 207*d* and the negative electrode 208*d* are not limited thereto. In a case where the specific busbar described later has a folded wiring portion, increase in the wiring inductance of the specific busbar can be effectively suppressed no matter where the positive electrode 207*d* and the negative electrode 208*d* are located. Therefore, locations of the positive electrode 207*d* and the negative electrode 208*d* are not limited to both sides of the smoothing capacitor 102*d*.

The capacitor module 100 includes the specific busbar 106 connected to a specific electrode which is one or each of both of the first electrode and the second electrode. In the present embodiment, each of both of positive electrodes 207*a*, 207*b*, 207*c*, 207*d* which are the first electrodes and negative electrodes 208*a*, 208*b*, 208*c*, 208*d* which are the second electrodes is the specific electrode. Therefore, both of a positive busbar 201 connected to the positive electrodes 207*a*, 207*b*, 207*c*, 207*d* and a negative busbar 202 connected to the negative electrodes 208*a*, 208*b*, 208*c*, 208*d* are the specific busbars 106. Although both of the positive busbar 201 and the negative busbar 202 are the specific busbars 106 in the present embodiment, without limitation thereto, one of the positive busbar 201 and the negative busbar 202 may be the specific busbar 106.

The positive busbar 201 and the negative busbar 202 are molded with the mold resin 205 in a state in which ends of their terminals connected to outside are exposed. The mold resin 205 is an insulating resin material such as epoxy resin. After components to be molded are placed in a mold, the mold resin 205 is injected into the mold so as to make sealing, whereby the capacitor module 100 is formed.

The positive busbar 201 has a body part 201*a*, a plurality of folded wiring portions 301, 302, 303, 304, a power supply connection terminal 203*a*, and a plurality of switching circuit connection terminals 203*b*, 203*c*, 203*d*. In the present embodiment, as shown in FIG. 3, the body part 201*a* extends in the second direction perpendicular to the first direction, the folded wiring portions 301, 302, 303, 304 are provided on one side in the first direction of the body part 201*a*, the power supply connection terminal 203*a* is provided on another side in the second direction of the body part 201*a*, and the switching circuit connection terminals 203*b*, 203*c*, 203*d* are provided on another side in the first direction of the body part 201*a*. An end of the power supply connection terminal 203*a* and ends of the switching circuit connection terminals 203*b*, 203*c*, 203*d* are exposed from the mold resin 205.

Ends of the folded wiring portions 301 to 304 are respectively connected to the positive electrodes 207*a* to 207*d* of the plurality of smoothing capacitors 102*a* to 102*d* via connection members 206 such as solder. The power supply connection terminal 203*a* is a terminal connected to the positive side of the DC power supply 2. The switching circuit connection terminals 203*b* to 203*d* are respectively connected to the switching elements forming the arms for the respective phases. For example, the switching circuit connection terminal 203*b* is connected to the U-phase switching element 103*a*, the switching circuit connection terminal 203*c* is connected to the V-phase switching element 104*a*, and the switching circuit connection terminal 203*d* is connected to the W-phase switching element 105*a*. The ends of the switching circuit connection terminals 203*b* to 203*d* and the positive sides of the power terminals (not shown) of the switching circuit 101 are joined to each other by arc welding such as TIG welding, for example.

The negative busbar 202 has a body part 202*a*, a plurality of folded wiring portions 305, 306, 307, 308, a power supply connection terminal 204*a*, and a plurality of switching circuit connection terminals 204*b*, 204*c*, 204*d*. In the present embodiment, as shown in FIG. 4, the body part 202*a* extends in the second direction perpendicular to the first direction, the folded wiring portions 305, 306, 307, 308 are provided on the one side in the first direction of the body part 202*a*, the power supply connection terminal 204*a* is provided on the other side in the second direction of the body part 201*a*, and the switching circuit connection terminals 204*b*, 204*c*, 204*d* are provided on the other side in the first direction of the body part 202*a*. An end of the power supply connection terminal 204*a* and ends of the switching circuit connection terminals 204*b*, 204*c*, 204*d* are exposed from the mold resin 205.

Ends of the folded wiring portions 305 to 308 are respectively connected to the negative electrodes 208*a* to 208*d* of the plurality of smoothing capacitors 102*a* to 102*d* via connection members 206 such as solder. The power supply connection terminal 204*a* is a terminal connected to the negative side of the DC power supply 2. The switching circuit connection terminals 204*b* to 204*d* are respectively connected to the switching elements forming the arms for the respective phases. For example, the switching circuit connection terminal 204*b* is connected to the U-phase switching element 103*b*, the switching circuit connection terminal 204*c* is connected to the V-phase switching element 104*b*, and the switching circuit connection terminal 204*d* is connected to the W-phase switching element 105*b*. The ends of the switching circuit connection terminals 204*b* to 204*d* and the negative sides of the power terminals (not shown) of the switching circuit 101 are joined to each other by arc welding such as TIG welding, for example.

In the present embodiment, each of the folded wiring portions 301 to 308 is respectively connected to the positive electrode 207*a* to 207*d* or the negative electrode 208*a* to 208*d* which is the specific electrode, only at the end of the folded wiring portion 301 to 308. Large currents flow in the positive busbar 201 and the negative busbar 202, so that the positive busbar 201 and the negative busbar 202 generate heat. With this structure, the number of contact points therebetween can be made as small as possible, whereby the positive busbar 201 and the negative busbar 202 having the folded wiring portions, and the smoothing capacitors 102*a* to 102*d* having the specific electrodes, can be prevented from thermally interfering with each other.

<Wiring Inductances>

Wiring inductances in the capacitor module 100 shown in the present embodiment will be described. The wiring inductance due to the positive busbar 201 corresponds to the wiring inductance 107 shown in FIG. 2, and the wiring inductance due to the negative busbar 202 corresponds to the wiring inductance 108 shown in FIG. 2. In FIG. 5, broken-line arrows indicate the directions of currents when surge voltage occurs.

As shown in FIG. 5, the body part 201*a* of the positive busbar 201 and the body part 202*a* of the negative busbar 202 are located so as to be arranged in the Z direction and oppose each other, and currents flow in opposite directions respectively through the body part 201*a* and the body part 202*a*. Thus, magnetic fluxes generated due to the currents flowing through the body part 201*a* and the body part 202*a* are canceled, whereby the wiring inductances of the body part 201*a* and the body part 202*a* can be reduced.

As shown in FIG. 3, the power supply connection terminals 203*a*, 204*a* are located so as to be arranged in the X direction, and currents flow in opposite directions respectively through the power supply connection terminals 203*a*, 204*a*. Thus, magnetic fluxes generated due to the currents flowing through the power supply connection terminals 203*a*, 204*a* are canceled, whereby the wiring inductances of the power supply connection terminals 203*a*, 204*a* can be reduced.

The switching circuit connection terminals 203*b*, 204*b*, the switching circuit connection terminals 203*c*, 204*c*, and the switching circuit connection terminals 203*d*, 204*d* are respectively located so as to be arranged in the Y direction, and currents flow in opposite directions respectively through the switching circuit connection terminals 203*b*, 204*b*, the switching circuit connection terminals 203*c*, 204*c*, and the switching circuit connection terminals 203*d*, 204*d*. Thus, magnetic fluxes generated due to the currents flowing respectively through the switching circuit connection terminals 203*b*, 204*b*, the switching circuit connection terminals 203*c*, 204*c*, and the switching circuit connection terminals 203*d*, 204*d* are canceled, whereby the wiring inductances of the switching circuit connection terminals 203*b*, 204*b*, the switching circuit connection terminals 203*c*, 204*c*, and the switching circuit connection terminals 203*d*, 204*d* can be reduced, respectively.

As shown in FIG. 5, a part of the negative busbar 202 that extends toward the negative electrode 208*d* from the body part 202*a* in the negative busbar 202 is located along the other side in the first direction of the smoothing capacitor 102*d*, and currents flow in opposite directions respectively through this part of the negative busbar 202 and the smoothing capacitor 102*d*. Thus, magnetic fluxes generated due to the currents flowing through this part of the negative busbar 202 and the smoothing capacitor 102*d* are canceled, whereby the wiring inductance of this part of the negative busbar 202 can be reduced.

On the other hand, in a case where the positive electrode 207*d* and the negative electrode 208*d* are away from each other as in such a case where the positive electrode 207*d* and the negative electrode 208*d* are provided on both sides of the smoothing capacitor 102*d*, the positions of the folded wiring portion 304 on the positive side and the folded wiring portion 308 on the negative side through which currents flow in opposite directions are far from each other. Therefore, between the folded wiring portion 304 and the folded wiring portion 308, magnetic fluxes generated at these portions cannot be canceled with each other. Thus, the wiring inductances cannot be reduced between the folded wiring portions 304, 308, the folded wiring portions 303, 307, the folded wiring portions 302, 306, and the folded wiring portions 301, 305, respectively.

<Folded Wiring Portions>

The folded wiring portions which are major parts of the present disclosure will be described. Each of the folded wiring portions effectively suppresses increase in the wiring inductance at each portion without being located adjacently to another wiring part. The specific busbar has the folded wiring portion having parts opposing each other by being folded, at the specific electrode, and an end of the folded wiring portion is connected to the specific electrode. In the present embodiment, the positive busbar 201 has the folded wiring portions 301 to 304 having parts opposing each other by being folded, at the respective positive electrodes 207*a* to 207*d*. The negative busbar 202 has the folded wiring portions 305 to 308 having parts opposing each other by being folded, at the respective negative electrodes 208*a* to 208*d*.

With reference to FIG. 6, suppression of increase in the wiring inductance by the folded wiring portion will be described. FIG. 6 shows the folded wiring portion 301 and a part therearound in FIG. 3. In FIG. 6, broken-line arrows indicate the directions of currents in the folded wiring portion 301 when surge voltage occurs. The folded wiring portion 301 is formed in a U shape with the bottom of the U shape located on the one side in the first direction, for example. A wiring part before folding and a wiring part after folding in the folded wiring portion 301 are located so as to oppose each other, and currents flow in opposite directions respectively through the opposing wiring parts. Thus, magnetic fluxes generated due to currents flowing through the folded wiring portion 301 are canceled, whereby increase in the wiring inductance of the folded wiring portion 301 can be effectively suppressed.

In the present embodiment, the smoothing capacitors 102*a* to 102*d* are provided on the one side in the first direction of the body part 201*a* of the positive busbar 201, and the folded wiring portions 301 to 304 are provided on the one side in the first direction of the body part 201*a* of the positive busbar 201. Similarly, the smoothing capacitors 102*a* to 102*d* are provided on the one side in the first direction of the body part 202*a* of the negative busbar 202, and the folded wiring portions 305 to 308 are provided on the one side in the first direction of the body part 202*a* of the negative busbar 202. The folded wiring portion 301 extends toward the one side in the first direction from the body part 201*a* of the positive busbar 201, and then is folded and extends toward the other side in the first direction, to be connected to the positive electrode 207*a* at an end on the other side in the first direction after folding in the folded wiring portion 301. The other folded wiring portions 302 to 308 also have the same structure.

The structure of the folded wiring portion 301 is not limited thereto. However, with this structure, the wiring length of the folded wiring portion is minimized and the opposing parts can be sufficiently ensured to be provided, whereby increase in the wiring inductance of the folded wiring portion 301 can be further effectively suppressed. In addition, since the length of the folded wiring portion is shortened, the specific busbar can be downsized.

In the present embodiment, the power converter 1 includes the plurality of smoothing capacitors 102*a* to 102*d*, and the body part 201*a* of the positive busbar 201 and the body part 202*a* of the negative busbar 202 extend in the second direction perpendicular to the first direction. The plurality of smoothing capacitors 102*a* to 102*d* are provided so as to be arranged in the second direction on the one side in the first direction of the body part 201*a* of the positive busbar 201 and the body part 202*a* of the negative busbar 202. The positive busbar 201 has the plurality of folded wiring portions 301 to 304, and the negative busbar 202 has the plurality of folded wiring portions 305 to 308. Each of the plurality of folded wiring portions 301 to 308 is respectively connected to the positive electrode 207*a* to 207*d* or the negative electrode 208*a* to 208*d* which is each specific electrode of the plurality of smoothing capacitors 102*a* to 102*d*.

With this structure, since the plurality of smoothing capacitors 102*a* to 102*d* are provided so as to be arranged in the second direction on the one side in the first direction of the body part 201*a* of the positive busbar 201 and the body part 202*a* of the negative busbar 202, the power converter 1 can be downsized. In addition, since all the smoothing capacitors 102*a* to 102*d* are connected to the positive busbar 201 and the negative busbar 202 by the folded wiring portions 301 to 308, increase in the wiring inductances of the positive busbar 201 and the negative busbar 202 can be effectively suppressed.

<Modifications>

The structures of the smoothing capacitor and the folded wiring portion are not limited to those shown in FIG. 6. FIGS. 7A to 7D show four modifications of the structures of the smoothing capacitor and the folded wiring portion. First, modifications of the smoothing capacitor will be described. In FIG. 6, the smoothing capacitor 102*a* is placed with its long side along the X direction and its short side along the Y direction. As shown in FIG. 7A, the smoothing capacitor 102*a* may be placed with its short side along the X direction and its long side along the Y direction. Alternatively, as shown in FIG. 7B, the smoothing capacitor 102*a* may be formed in a round shape.

Next, modifications of the folded wiring portion will be described. In FIG. 6, the folded wiring portion 301 is provided so as to extend toward the one side in the first direction from the body part 201*a* of the positive busbar 201, and then be folded and extend toward the other side in the first direction. As shown in FIG. 7C, the folded wiring portion 301 may be provided so as to extend toward the other side in the second direction, and then be folded and extend toward the one side in the second direction. The structure of the folded wiring portion 301 is not limited thereto, and increase in the wiring inductance can be effectively suppressed as long as the folded wiring portion 301 has parts opposing each other by being folded.

In FIG. 6, the folded wiring portion 301 is formed such that almost entire wiring parts thereof oppose each other. The structure of the opposing parts is not limited thereto, and the opposing parts may be parts in a partial range. As shown in FIG. 7D, in such a case where there are constraints due to placement of the connection member 206, the opposing parts may be parts in at least a partial range. As long as the folded wiring portion 301 has parts opposing each other by being held in at least a partial range, increase in the wiring inductance can be effectively suppressed. In FIGS. 7A to 7D, the folded wiring portion 301 of the positive busbar 201 has been described, but the same applies to the other folded wiring portions 302 to 304 of the positive busbar 201 and the folded wiring portions 305 to 308 of the negative busbar 202.

<Reduction Rate of Wiring Inductance>

With reference to FIGS. 8A to 8C, the relationship between the reduction rate of the wiring inductance, and the wiring width of the folded wiring portion and the wiring opposing part interval of the folded wiring portion, will be described. First, a mutual inductance and a combined inductance will be described. FIG. 8B is a plan view schematically showing the shape of the folded wiring portion in the present embodiment. In the drawing, the folded wiring portion 401 has opposing portions 401*a*, 401*b* which are parts opposing each other by being folded. The self-inductances of the opposing portions 401*a*, 401*b* are denoted by $L_{401a}$, $L_{401b}$, respectively. Where a coupling coefficient between $L_{401a}$ and $L_{401b}$ is denoted by K, a mutual inductance M between $L_{401a}$, and $L_{401b}$ is represented by Expression (2).

[Mathematical 2]

$$M=K\times\sqrt{L_{401a}\times L_{401b}} \quad (2)$$

From Expression (2), it is found that, as the coupling coefficient K increases, the mutual inductance M increases. When currents flow in opposite directions through the opposing portion 401*a* and the opposing portion 401*b*, magnetic fluxes generated at the adjacent wiring parts are canceled. Combined inductances $L_{401a(M)}$ and $L_{401b(M)}$ of the opposing portion 401*a* and the opposing portion 401*b* are represented by Expression (3) and Expression (4).

[Mathematical 3]

$$L_{401a(M)}=L_{401a}-M \quad (3)$$

[Mathematical 4]

$$L_{401b(M)}=L_{401b}-M \quad (4)$$

From Expression (2), Expression (3), and Expression (4), as the coupling coefficient K increases, the mutual inductance M increases, so that the combined inductances $L_{401a(M)}$ and $L_{401b(M)}$ can be reduced. Since the combined inductances $L_{401a(M)}$ and $L_{401b(M)}$ are reduced, the wiring inductance of the folded wiring portion 401 can be reduced.

In FIG. 8B, the wiring width of the folded wiring portion 401 is denoted by a1 [mm], the wiring opposing part interval of the folded wiring portion 401 is denoted by b1 [mm], and the wiring opposing part length of the folded wiring portion 401 is denoted by c1 [mm]. FIG. 8C is a plan view showing the shape of a wiring portion having only a straight-extending part and not folded. The wiring portion shown in FIG. 8C is referred to as a straight wiring portion 402. The straight wiring portion 402 has the same width a1 [mm] as the wiring width of the folded wiring portion 401, and the same length c1 [mm] as the wiring opposing part length of the folded wiring portion 401.

In FIG. 8B and FIG. 8C, current was caused to flow in the arrow direction, while the width a1 [mm] and the length c1 [mm] were set as fixed values and the interval b1 [mm] was set as a variable. At this time, a result of analytical calculation of the relationship of the ratio of the combined inductance $L_{401(M)}$ of the folded wiring portion 401 and the combined inductance $L_{402(M)}$ of the straight wiring portion 402 is shown in FIG. 8A. In FIG. 8A, the horizontal axis indicates the ratio of the interval b1 [mm] and the width a1 [mm] shown in FIG. 8B, and the vertical axis indicates the ratio of the combined inductances $L_{401(M)}$ and $L_{402(M)}$. From Expression (2), Expression (3), Expression (4), and FIG. 8A, it is found that, as the interval b1 [mm] decreases, the coupling coefficient K of the mutual inductance increases, so that the combined inductance $L_{401(M)}$ is reduced.

From FIG. 8A, if the ratio of the interval b1/the width a1 is set to 1, the ratio of the combined inductances $L_{401(M)}$ and $L_{402(M)}$ is not greater than 1. In the present embodiment, where the wiring width of the folded wiring portion is denoted by a1 and the wiring opposing part interval of the folded wiring portion is denoted by b1, b1≤a1 is satisfied. If b1≤a1 is satisfied, the combined inductance $L_{401(M)}$ of the folded wiring portion 401 can be reduced as compared to the combined inductance $L_{402(M)}$ of the straight wiring portion 402, whereby increase in the wiring inductance of the specific busbar can be effectively suppressed.

In the present embodiment, the switching element has been described as a MOSFET. As the MOSFET, it is possible to use a MOSFET formed by a wide bandgap semiconductor element such as SiC or GaN, which is capable of high-frequency driving, has a high switching speed (dv/dt, di/dt), and can be reduced in loss. If the switching speed (di/dt) is high, surge voltage also becomes great. That is, if the power converter 1 shown in the present embodiment is formed using the wide bandgap semiconductor element, the surge voltage and heat generation in the wide bandgap semiconductor element can be suppressed, whereby downsizing and efficiency improvement of the power converter 1 can be further achieved.

As described above, the power converter 1 according to the first embodiment includes: the smoothing capacitor 102 having the first electrode and the second electrode; and the specific busbar connected to the specific electrode which is one or each of both of the first electrode and the second electrode. The specific busbar has the folded wiring portion having parts opposing each other by being folded, at the specific electrode, and an end of the folded wiring portion is connected to the specific electrode. Thus, the wiring part before folding and the wiring part after folding in the folded wiring portion are located so as to oppose each other, and currents flow in opposite directions respectively through the opposing wiring parts, so that magnetic fluxes generated due to current flowing through the folded wiring portion are canceled, whereby increase in the wiring inductance of the folded wiring portion connected to the smoothing capacitor 102 can be effectively suppressed. In addition, at the parts other than the folded wiring portions in the positive busbar 201 and the negative busbar 202 which are the specific busbars, currents flow in opposite directions through the parts located adjacently to each other. Thus, increase in the wiring inductances of the positive busbar 201 and the negative busbar 202 connected to the smoothing capacitor 102 can be effectively suppressed.

Where the wiring width of the folded wiring portion is denoted by a1 and the wiring opposing part interval of the folded wiring portion is denoted by b1, $b1 \leq a1$ may be satisfied. Thus, the combined inductance of the folded wiring portion can be reduced as compared to the combined inductance of a straight wiring portion in a case of forming the wiring in a straight shape. Since the combined inductance of the folded wiring portion is reduced, increase in the wiring inductance of the specific busbar can be effectively suppressed. The folded wiring portion may be connected to the specific electrode only at the end of the folded wiring portion. Thus, the number of contact points between the folded wiring portion and the specific electrode can be made as small as possible, whereby the positive busbar 201 and the negative busbar 202 having the folded wiring portions, and the smoothing capacitors 102*a* to 102*d* having the specific electrodes, can be prevented from thermally interfering with each other.

The smoothing capacitor may be provided on the one side in the first direction of the body part of the specific busbar, the folded wiring portion may be provided on the one side in the first direction of the body part of the specific busbar, and the folded wiring portion may extend toward the one side in the first direction from the body part of the specific busbar, and then be folded and extend toward the other side in the first direction, to be connected to the specific electrode at an end on the other side in the first direction after folding in the folded wiring portion. Thus, the wiring length of the folded wiring portion is minimized and the opposing parts can be sufficiently ensured to be provided, whereby increase in the wiring inductance of the folded wiring portion 301 can be further effectively suppressed.

The power converter 1 may include the plurality of smoothing capacitors 102*a* to 102*d*, the body part of the specific busbar may extend in the second direction perpendicular to the first direction, the plurality of smoothing capacitors 102*a* to 102*d* may be provided so as to be arranged in the second direction on the one side in the first direction of the body part of the specific busbar, the specific busbar may have a plurality of folded wiring portions, and each of the plurality of folded wiring portions may be respectively connected to each specific electrode of the plurality of smoothing capacitors 102*a* to 102*d*. Thus, since the plurality of smoothing capacitors 102*a* to 102*d* are provided so as to be arranged in the second direction on the one side in the first direction of the body part of the specific busbar, the power converter 1 can be downsized. In addition, since all the smoothing capacitors 102*a* to 102*d* are connected to the specific busbars by the folded wiring portions 301 to 308, increase in the wiring inductances of the specific busbars can be effectively suppressed.

The power converter 1 may include the switching circuit 101 connected to the smoothing capacitor 102 and including a semiconductor element for performing, through switching, power conversion of DC voltage applied to the smoothing capacitor 102, and the semiconductor element may be a wide bandgap semiconductor element. Thus, surge voltage and heat generation in the wide bandgap semiconductor element can be suppressed, whereby downsizing and efficiency improvement of the power converter 1 can be further achieved.

Second Embodiment

Figure 9:
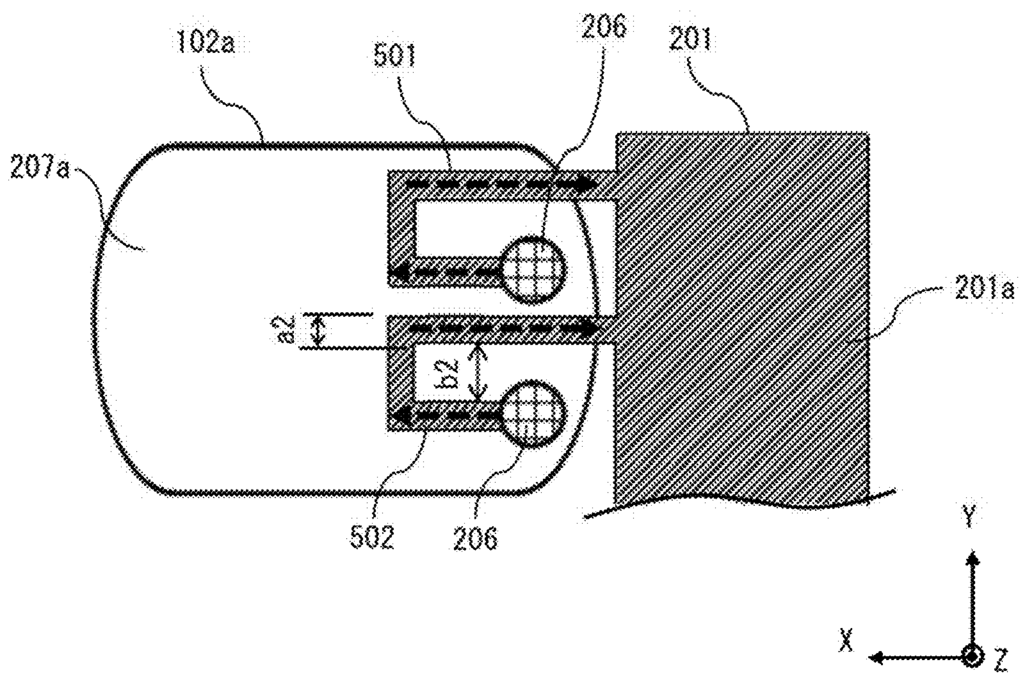
FIG. 9 is a plan view of a major part of a capacitor module of a power converter according to the second embodiment of the present disclosure.
Figure 10:
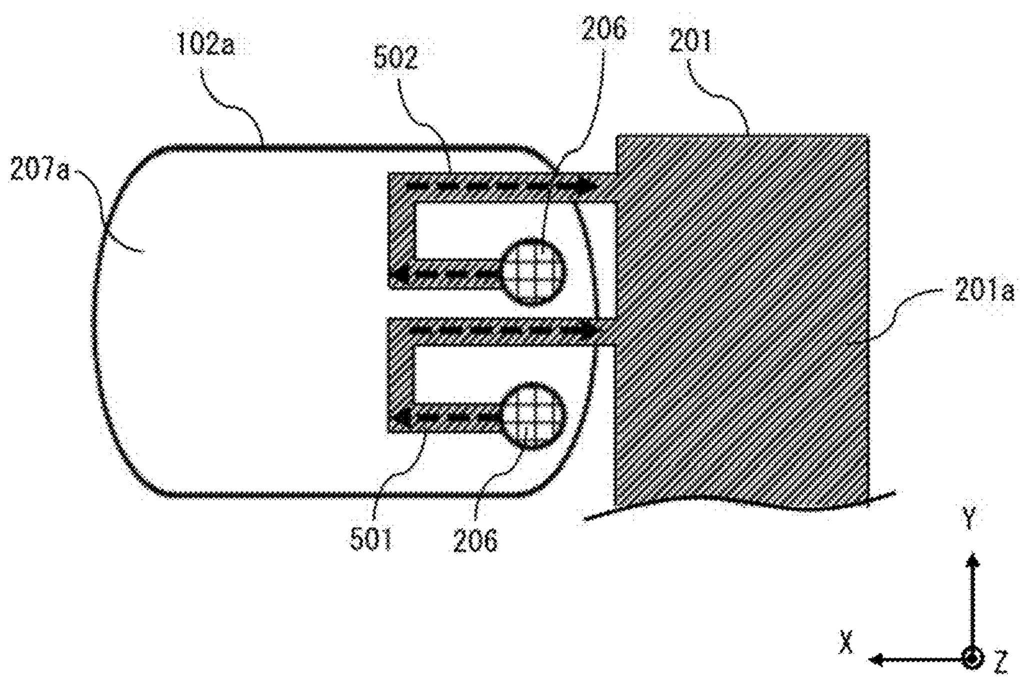
FIG. 10 is a plan view of a major part of another capacitor module of the power converter according to the second embodiment.
Figure 11:
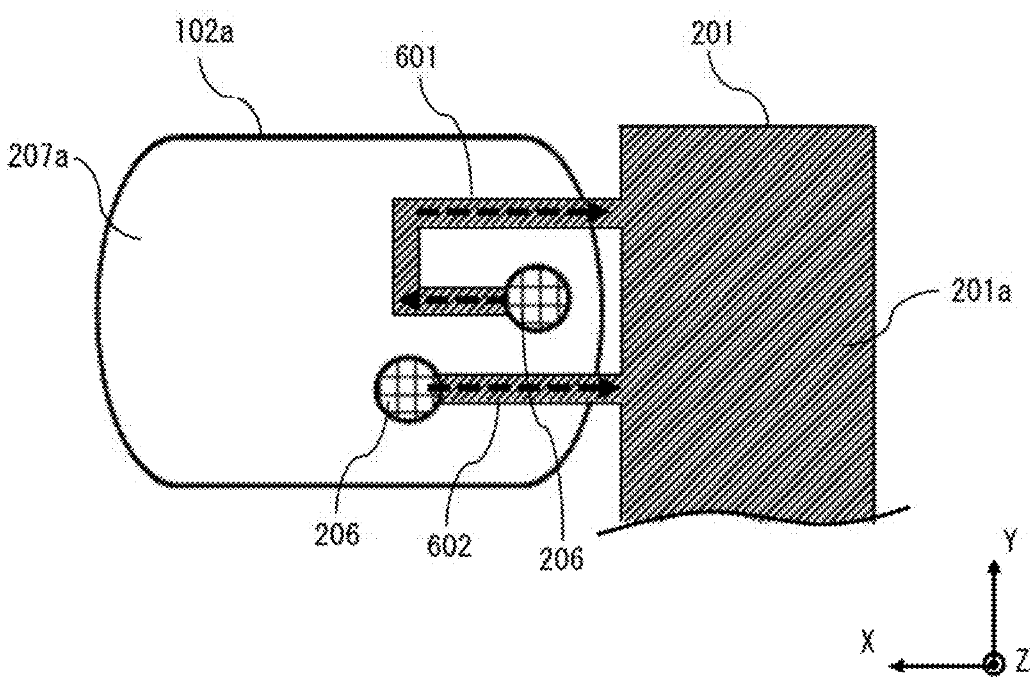
FIG. 11 is a plan view of a major part of another capacitor module of the power converter according to the second embodiment.

The power converter 1 according to the second embodiment will be described. FIG. 9 is a plan view of a major part of the capacitor module 100 of the power converter 1, and shows a part equivalent to FIG. 6. FIG. 10 is a plan view of a major part of another capacitor module 100 of the power converter 1, and shows a part equivalent to FIG. 6. FIG. 11 is a plan view of a major part of another capacitor module 100 of the power converter 1, and shows a part equivalent to FIG. 6. In the capacitor module 100 of the power converter 1 according to the second embodiment, the specific busbar has an additional wiring portion.

The specific busbar has an additional wiring portion located at the specific electrode, and an end of the additional wiring portion is connected to the specific electrode. The additional wiring portion has an opposing portion opposing an opposed portion which is a part of the folded wiring portion, and the current direction of the opposing portion of the additional wiring portion and the current direction of the opposed portion of the folded wiring portion are opposite to each other. Since the specific busbar has the additional wiring portion in addition to the folded wiring portion, wiring paths are increased, whereby the wiring inductance of the specific busbar can be reduced. In addition, since the current direction of the opposing portion of the additional wiring portion and the current direction of the opposed portion of the folded wiring portion are opposite to each other, magnetic fluxes generated due to currents flowing through the opposing portion and the opposed portion are canceled, whereby increase in the wiring inductances of the folded wiring portion and the additional wiring portion connected to the smoothing capacitor 102 can be effectively suppressed. Hereinafter, specific structure examples of the additional wiring portion will be described.

First, a case where an additional wiring portion 502 has parts opposing each other by being folded, at the positive electrode 207*a* of the specific electrode, will be described. As shown in FIG. 9, the positive busbar 201 which is the specific busbar has a folded wiring portion 501 and the additional wiring portion 502. In the present embodiment, the folded wiring portion 501 and the additional wiring portion 502 have the same shape, and are provided so as to be arranged in the second direction. In the present embodiment, each of the folded wiring portion 501 and the additional wiring portion 502 extends toward the one side in the first direction from the body part 201*a* of the positive busbar 201, and then is folded and extends toward the other side of the first direction, to be connected to the positive electrode 207*a* via a connection member 206 at an end on the other side in the first direction after folding in each of the folded wiring portion 501 and the additional wiring portion 502. The part on the side connected to the positive electrode 207*a* relative to the folded part in the folded wiring portion 501 is the opposed portion, and the part on the side opposite to the side connected to the positive electrode 207*a* relative to the folded part in the additional wiring portion 502 is the opposing portion. In FIG. 9, broken-line arrows indicate the directions of currents when surge voltage occurs.

With this structure, the folded wiring portion 501 and the additional wiring portion 502 have wiring parts opposing each other, and currents flow in opposite directions respectively through the opposing wiring parts. Thus, magnetic fluxes generated due to the currents flowing respectively through the folded wiring portion 501 and the additional wiring portion 502 are canceled, whereby increase in the wiring inductances of the folded wiring portion 501 and the additional wiring portion 502 connected to the smoothing capacitor 102*a* can be effectively suppressed. In addition, since the current direction of the opposing portion of the additional wiring portion 502 and the current direction of the opposed portion of the folded wiring portion 501 are opposite to each other, magnetic fluxes generated due to currents flowing through the opposing portion and the opposed portion are canceled, whereby increase in the wiring inductances of the folded wiring portion 501 and the additional wiring portion 502 connected to the smoothing capacitor 102*a* can be further effectively suppressed. In FIG. 9, the folded wiring portion 501 and the additional wiring portion 502 of the positive busbar 201 have been described. However, also for the other folded wiring portions of the positive busbar 201 and the folded wiring portions of the negative busbar 202, the same effects can be obtained by providing the additional wiring portions so as to be arranged therewith.

In the present embodiment, the additional wiring portion 502 is connected to the positive electrode 207*a* only at an end of the additional wiring portion 502. Since the number of contact points between the additional wiring portion 502 and the positive electrode 207*a* can be made as small as possible, the positive busbar 201 having the additional wiring portion 502 and the smoothing capacitor 102 having the positive electrode 207*a* can be prevented from thermally interfering with each other.

Where the wiring width of the additional wiring portion 502 is denoted by a2 and the wiring opposing part interval of the additional wiring portion 502 is denoted by b2, $b2 \leq a2$ is satisfied. With this structure, the combined inductance of the additional wiring portion 502 can be reduced as compared to the combined inductance of a straight wiring portion in a case of forming the wiring in a straight shape. Since the combined inductance of the additional wiring portion 502 is reduced, increase in the wiring inductance of the positive busbar 201 can be effectively suppressed.

In FIG. 9, the folded wiring portion 501 is located on the one side in the second direction, and the additional wiring portion 502 is located on the other side in the second direction. Locations of the folded wiring portion 501 and the additional wiring portion 502 are not limited thereto, and as shown in FIG. 10, the folded wiring portion 501 may be located on the other side in the second direction, and the additional wiring portion 502 may be located on the one side in the second direction. In the case where the folded wiring portion 501 and the additional wiring portion 502 are located as described above, the part on the side opposite to the side connected to the positive electrode 207*a* relative to the folded part in the folded wiring portion 501 is the opposed portion, and the part on the side connected to the positive electrode 207*a* relative to the folded part in the additional wiring portion 502 is the opposing portion. Even with this structure, since the current direction of the opposing portion of the additional wiring portion 502 and the current direction of the opposed portion of the folded wiring portion 501 are opposite to each other, the magnetic fluxes generated due to currents flowing through the opposing portion and the opposed portion are canceled, whereby increase in the wiring inductances of the folded wiring portion 501 and the additional wiring portion 502 connected to the smoothing capacitor 102*a* can be further effectively suppressed.

Next, a case where an additional wiring portion 602 has a part extending in a straight shape, at the positive electrode 207*a* which is the specific electrode, will be described. As shown in FIG. 11, the positive busbar 201 which is the specific busbar has a folded wiring portion 601 and the additional wiring portion 602. In the present embodiment, the folded wiring portion 601 and the additional wiring portion 602 have different shapes, and they are provided so as to be arranged in the second direction such that the folded wiring portion 601 is located on the one side in the second direction and the additional wiring portion 602 is located on the other side in the second direction. In the present embodiment, the folded wiring portion 601 extends toward the one side in the first direction from the body part 201*a* of the positive busbar 201, and then is folded and extends toward the other side in the first direction, to be connected to the positive electrode 207*a* via a connection member 206 at an end on the other side in the first direction after folding in the folded wiring portion 601. The additional wiring portion 602 extends toward the one side in the first direction from the body part 201*a* of the positive busbar 201, to be connected to the positive electrode 207*a* via a connection member 206 at an end on the one side in the first direction after extension in the additional wiring portion 602. The part on the side connected to the positive electrode 207*a* relative to the folded part in the folded wiring portion 601 is the opposed portion, and the part opposing the opposed portion in the additional wiring portion 602 is the opposing portion. In FIG. 11, broken-line arrows indicate the directions of currents when surge voltage occurs.

With this structure, the folded wiring portion 601 has the wiring parts opposing each other, and currents flow in opposite directions respectively through the opposing wiring parts, so that magnetic fluxes generated due to current flowing through the folded wiring portion 601 are canceled, whereby increase in the wiring inductance of the folded wiring portion 601 connected to the smoothing capacitor 102*a* can be effectively suppressed. In addition, since the current direction of the opposing portion of the additional wiring portion 602 and the current direction of the opposed portion of the folded wiring portion 601 are opposite to each other, magnetic fluxes generated due to currents flowing through the opposing portion and the opposed portion are canceled, whereby increase in the wiring inductances of the folded wiring portion 601 and the additional wiring portion 602 connected to the smoothing capacitor 102*a* can be effectively suppressed. In addition, since the additional wiring portion 602 is formed in a straight shape, the additional wiring portion 602 can be easily manufactured, so that productivity of the specific busbar having the additional wiring portion 602 can be improved. In FIG. 11, the folded wiring portion 601 and the additional wiring portion 602 of the positive busbar 201 have been described. However, also for the other folded wiring portions of the positive busbar 201 and the folded wiring portions of the negative busbar 202, the same effects can be obtained by providing the additional wiring portions so as to be arranged therewith.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

(Additional Note 1)

A power converter comprising:

a capacitor having a first electrode and a second electrode; and a specific busbar connected to a specific electrode which is one or each of both of the first electrode and the second electrode, wherein the specific busbar has a folded wiring portion having parts opposing each other by being folded, at the specific electrode, and an end of the folded wiring portion is connected to the specific electrode.

(Additional Note 2)

The power converter according to additional note 1, wherein the specific busbar has an additional wiring portion located at the specific electrode, and an end of the additional wiring portion is connected to the specific electrode, the additional wiring portion has an opposing portion opposing an opposed portion which is a part of the folded wiring portion, and a current direction of the opposing portion of the additional wiring portion and a current direction of the opposed portion of the folded wiring portion are opposite to each other.

(Additional Note 3)

The power converter according to additional note 2, wherein the additional wiring portion has parts opposing each other by being folded, at the specific electrode, and a part on a side connected to the specific electrode relative to a folded part in the folded wiring portion is the opposed portion, and a part on a side opposite to a side connected to the specific electrode relative to a folded part in the additional wiring portion is the opposing portion, or a part on a side opposite to the side connected to the specific electrode relative to the folded part in the folded wiring portion is the opposed portion, and a part on the side connected to the specific electrode relative to the folded part in the additional wiring portion is the opposing portion.

(Additional Note 4)

The power converter according to additional note 2, wherein the additional wiring portion has a part extending in a straight shape, at the specific electrode, and a part on a side connected to the specific electrode relative to a folded part in the folded wiring portion is the opposed portion, and a part opposing the opposed portion in the additional wiring portion is the opposing portion.

(Additional Note 5)

The power converter according to any one of additional notes 1 to 4, wherein where a wiring width of the folded wiring portion is denoted by a1 and a wiring opposing part interval of the folded wiring portion is denoted by b1, $b1 \leq a1$ is satisfied.

(Additional Note 6)

The power converter according to additional note 3, wherein where a wiring width of the additional wiring portion is denoted by a2 and a wiring opposing part interval of the additional wiring portion is denoted by b2, $b2 \leq a2$ is satisfied.

(Additional Note 7)

The power converter according to any one of additional notes 1 to 6, wherein the folded wiring portion is connected to the specific electrode only at the end of the folded wiring portion.

(Additional Note 8)

The power converter according to any one of additional notes 2 to 4, wherein the additional wiring portion is connected to the specific electrode only at the end of the additional wiring portion.

(Additional Note 9)

The power converter according to any one of additional notes 1 to 8, wherein the capacitor is provided on one side in a first direction of a body part of the specific busbar, the folded wiring portion is provided on the one side in the first direction of the body part of the specific busbar, and the folded wiring portion extends toward the one side in the first direction from the body part of the specific busbar, and then is folded and extends toward another side in the first direction, to be connected to the specific electrode at an end on the other side in the first direction after folding in the folded wiring portion.

(Additional Note 10)

The power converter according to additional note 9, comprising a plurality of the capacitors, wherein the body part of the specific busbar extends in a second direction perpendicular to the first direction, the plurality of capacitors are provided so as to be arranged in the second direction on the one side in the first direction of the body part of the specific busbar, the specific busbar has a plurality of the folded wiring portions, and each of the plurality of folded wiring portions is respectively connected to each specific electrode of the plurality of capacitors.

(Additional Note 11)

The power converter according to any one of additional notes 1 to 10, further comprising a switching circuit connected to the capacitor and including a semiconductor element for performing, through switching, power conversion of DC voltage applied to the capacitor, wherein the semiconductor element is a wide bandgap semiconductor element.

DESCRIPTION OF THE REFERENCE CHARACTERS

1 power converter
2 DC power supply
3 three-phase AC motor
100 capacitor module
101 switching circuit
102, 102*a*, 102*b*, 102*c*, 102*d* smoothing capacitor
103*a*, 103*b* U-phase switching element
104*a*, 104*b* V-phase switching element
105*a*, 105*b* W-phase switching element
106 specific busbar
107, 108 wiring inductance
109 inductance load
201 positive busbar
201*a* body part
202 negative busbar
202*a* body part
203*a*, 204*a* power supply connection terminal
203*b*, 203*c*, 203*d*, 204*b*, 204*c*, 204*d* switching circuit connection terminal
205 mold resin
206 connection member
207*a*, 207*b*, 207*c*, 207*d* positive electrode
208*a*, 208*b*, 208*c*, 208*d* negative electrode
301, 302, 303, 304, 305, 306, 307, 308 folded wiring portion
401 folded wiring portion
401*a*, 401*b* opposing portion
402 straight wiring portion
501 folded wiring portion
502 additional wiring portion
601 folded wiring portion
602 additional wiring portion

What is claimed is:

1. A power converter comprising:

a capacitor having a first electrode and a second electrode; and a specific busbar connected to a specific electrode which is one or each of both of the first electrode and the second electrode, wherein the specific busbar has a folded wiring portion having an opposing portion, extending in a first direction from a body part of the specific bushbar, and an opposed portion, extending in a direction opposite to the first direction, opposing each other by being folded, the opposing portion and the opposed portion being located at one of the first electrode and the second electrode, and a first end of the folded wiring portion being connected to the body part of the specific bushbar and a second end of the folded wiring portion being connected to the one of the first electrode and the second electrode, wherein the opposing portion and the opposed portion face each other in a second direction that intersects with the first direction, the first direction and the second direction being parallel to a surface of one of the first electrode and the second electrode.

2. The power converter according to claim 1, further comprising a switching circuit connected to the capacitor and including a semiconductor element for performing, through switching, power conversion of DC voltage applied to the capacitor, wherein the semiconductor element is a wide bandgap semiconductor element.

3. The power converter according to claim 1, wherein the folded wiring portion is connected to the specific electrode only at the end of the folded wiring portion.

4. The power converter according to claim 1, wherein the specific busbar has an additional wiring portion located at the specific electrode, and an end of the additional wiring portion is connected to the specific electrode, the additional wiring portion has the opposing portion opposing the opposed portion which is a part of the folded wiring portion, and a current direction of the opposing portion of the additional wiring portion and a current direction of the opposed portion of the folded wiring portion are opposite to each other.

5. The power converter according to claim 4, wherein the additional wiring portion is connected to the specific electrode only at the end of the additional wiring portion.

6. The power converter according to claim 4, wherein the additional wiring portion has a part extending in a straight shape, at the specific electrode, and a part on a side connected to the specific electrode relative to a folded part in the folded wiring portion is the opposed portion, and a part opposing the opposed portion in the additional wiring portion is the opposing portion.

7. The power converter according to claim 4, wherein the additional wiring portion has parts opposing each other by being folded, at the specific electrode, and a part on a side connected to the specific electrode relative to a folded part in the folded wiring portion is the opposed portion, and a part on a side opposite to a side connected to the specific electrode relative to a folded part in the additional wiring portion is the opposing portion, or a part on a side opposite to the side connected to the specific electrode relative to the folded part in the folded wiring portion is the opposed portion, and a part on the side connected to the specific electrode relative to the folded part in the additional wiring portion is the opposing portion.

8. The power converter according to claim 7, wherein where a wiring width of the additional wiring portion is denoted by a2 and a wiring opposing part interval of the additional wiring portion is denoted by b2, $b2 \leq a2$ is satisfied.

9. A power converter comprising:

a capacitor having a first electrode and a second electrode; and a specific busbar connected to a specific electrode which is one or each of both of the first electrode and the second electrode, wherein the specific busbar has a folded wiring portion having an opposing portion, extending in a first direction from a body part of the specific busbar, and an opposed portion, extending in a direction opposite to the first direction, opposing each other by being folded, the opposing portion and the opposed portion being located at one of the first electrode and the second electrode, and a first end of the folded wiring portion being connected to the body part of the specific busbar and a second end of the folded wiring portion being connected to the one of the first electrode and the second electrode, wherein the opposing portion and the opposed portion face each other in a second direction that intersects with the first direction, the first direction and the second direction being parallel to a surface of one of the first electrode and the second electrode, and where a wiring width of the folded wiring portion is denoted by al and a wiring opposing part interval of the folded wiring portion is denoted by b1, b1≤a1 is satisfied.

10. A power converter comprising:

a capacitor having a first electrode and a second electrode; and a specific busbar connected to a specific electrode which is one or each of both of the first electrode and the second electrode, wherein the specific busbar has a folded wiring portion having parts opposing each other by being folded, at the specific electrode, and an end of the folded wiring portion is connected to the specific electrode, wherein the capacitor is provided on a first side in a first direction of a body part of the specific busbar, the folded wiring portion is provided on the first side in the first direction of the body part of the specific busbar, and the folded wiring portion extends toward in the first direction from the body part of the specific busbar, and then is folded and extends in a direction opposite to the first direction, to be connected to the specific electrode at an end after being folded in the folded wiring portion.

11. The power converter according to claim 10, comprising a plurality of the capacitors, wherein the body part of the specific busbar extends in a second direction perpendicular to the first direction, the plurality of capacitors are provided so as to be arranged in the second direction on the one side in the first direction of the body part of the specific busbar, the specific busbar has a plurality of the folded wiring portions, and each of the plurality of folded wiring portions is respectively connected to each specific electrode of the plurality of capacitors.

* * * * *